(12) United States Patent
Holzhausen

(10) Patent No.: US 8,382,044 B2
(45) Date of Patent: Feb. 26, 2013

(54) HIGH-LIFT SYSTEM ON THE WING OF AN AIRCRAFT, AND METHOD FOR ITS OPERATION

(75) Inventor: Torsten Holzhausen, Bargstedt (DE)

(73) Assignee: Airbus Operations GmbH, Hamburg (DE)

( * ) Notice: Subject to any disclaimer, the term of this patent is extended or adjusted under 35 U.S.C. 154(b) by 124 days.

(21) Appl. No.: 12/514,379

(22) PCT Filed: Nov. 12, 2007

(86) PCT No.: PCT/EP2007/009785
§ 371 (c)(1),
(2), (4) Date: May 10, 2010

(87) PCT Pub. No.: WO2008/058695
PCT Pub. Date: May 22, 2008

(65) Prior Publication Data
US 2010/0219299 A1    Sep. 2, 2010

(30) Foreign Application Priority Data

Nov. 11, 2006  (DE) .......................... 10 2006 053 259

(51) Int. Cl.
*B64C 3/58* (2006.01)
(52) U.S. Cl. .......................... 244/213; 244/214; 244/219
(58) Field of Classification Search .......... 244/210–219, 244/99.2, 99.3, 99.8
See application file for complete search history.

(56) References Cited

U.S. PATENT DOCUMENTS

| 2,117,607 | A | | 5/1938 | Griswold | |
|---|---|---|---|---|---|
| 3,949,957 | A | * | 4/1976 | Portier | 244/210 |
| 4,042,191 | A | * | 8/1977 | Johnson | 244/214 |
| 4,159,089 | A | | 6/1979 | Cole | |
| 4,260,045 | A | * | 4/1981 | Hack | 192/223 |
| 4,915,327 | A | * | 4/1990 | Ellmers et al. | 244/210 |
| 6,123,296 | A | * | 9/2000 | Mangalam | 244/204 |
| 6,371,415 | B1 | * | 4/2002 | Lorkowski et al. | 244/214 |
| 6,643,568 | B2 | * | 11/2003 | Chatrenet et al. | 701/15 |
| 7,366,592 | B2 | * | 4/2008 | Delaplace et al. | 701/4 |
| 7,506,842 | B2 | * | 3/2009 | Jones | 244/226 |
| 7,726,610 | B2 | * | 6/2010 | Good et al. | 244/217 |
| 7,891,611 | B2 | * | 2/2011 | Huynh et al. | 244/215 |

(Continued)

FOREIGN PATENT DOCUMENTS

| DE | 2451887 A1 | 6/1975 |
|---|---|---|
| EP | 1498794 A1 | 1/2005 |

(Continued)

OTHER PUBLICATIONS

Written Opinion of the International Searching Authority for related application PCT/EP2007/009785.

(Continued)

*Primary Examiner* — Christopher P Ellis
*Assistant Examiner* — Medhat Badawi
(74) *Attorney, Agent, or Firm* — Greenblum & Bernstein, P.L.C.

(57) ABSTRACT

A high-lift system on the wing of an aircraft and a method for its operation are described. High-lift flaps (2) which are arranged on the wing (1) are extended from a retracted position in order to increase the lift, and a slot (3) through which flow passes from the lower face to the upper face of the wing (1) is opened (advanced slat/flap-gap control). According to the invention, the slot (3) through which flow passes is opened independently of the position of the high-lift flap (2). This makes it possible to selectively achieve a better maximum coefficient of lift (CL) or a better lift-to-drag ratio with less noise being produced.

17 Claims, 3 Drawing Sheets

U.S. PATENT DOCUMENTS

| | | | |
|---|---|---|---|
| 7,913,955 B2 * | 3/2011 | Jones | 244/226 |
| 2006/0169847 A1 | 8/2006 | Konings | |
| 2006/0175468 A1 | 8/2006 | Huynh et al. | |
| 2007/0185628 A1 * | 8/2007 | Delaplace et al. | 701/4 |
| 2008/0179464 A1 | 7/2008 | Bender et al. | |

FOREIGN PATENT DOCUMENTS

| | | |
|---|---|---|
| WO | WO 2006/108579 A | 10/2006 |

OTHER PUBLICATIONS

German Office Action dated Feb. 1, 2008 that issued in priority application No. 10 2006 053 259.7, along with a partial English-language translation.

English-language translation of Office Action in related Japanese Application dated Jun. 26, 2012.

* cited by examiner

HIGH-LIFT SYSTEM ON THE WING OF AN AIRCRAFT, AND METHOD FOR ITS OPERATION

The invention relates to a high-lift system on the wing of an aircraft, having high-lift flaps arranged on the wing and having a device for operating the high-lift system, by means of which device the high-lift flaps can be extended from a retracted position in order to increase the lift and a slot, through which flow passes from the lower face to the upper face of the wing, is opened, and to a method for operating a high-lift system such as this (advanced slat/flap-gap control).

In many aircraft, in particular commercial and transport aircraft, high-lift systems are provided and are used to increase the lift during take-off and landing. High-lift systems such as these have high-lift flaps in the form of slats or leading edge slats and trailing edge flaps arranged on the wing.

The high-lift flaps described here are a component of the high-lift system. In this case, any flap under consideration may optionally be a wing leading-edge slat and/or a wing trailing-edge flap. The embodiment according to the invention may extend to all or to only individual high-lift flaps in the wingspan direction.

The flap system is extended to an ever greater extent in order to maintain the lift as the speed decreases. This is done as a function of the airspeed or else, possibly, of the angle of attack of the wing or the pitch angle of the aircraft. During extension, a slot is opened between the flaps and the wing, through which air is passed to the upper face of the aerodynamically active profile (between the leading-edge slat and mainplane and/or between the mainplane and the trailing-edge flap), thus increasing the maximum lift.

In known high-lift systems, the opening position of the slot is linked to the respective flap position by fixed kinematics. The air flowing through the slot increases the maximum lift, while at the same time reducing the lift-to-drag ratio. The turbulence in the greatly accelerated flow in the slot results in additional noise.

The coefficient of lift $C_L$ is a function of the angle of attack, that is to say of the angle between the wing profile chord and the incident air, and of the respective position of the leading-edge slats and trailing-edge flaps.

When the flow is laminar on the wing profile, then there is a largely linear relationship between the angle of attack and the coefficient of lift $C_L$. Above a specific angle of attack $\alpha_{stall}$, the flow starts to separate from the wing profile (that is to say stalls) and the coefficient of lift decreases as the angle of attack increases further. In the case of a wing whose high-lift system has a slot through which flow passes, the stalling point occurs at a higher angle of attack, and the maximum lift is greater than in the case of a high-lift system without a slot.

The object of the invention is to provide a high-lift system which on the one hand allows a good lift-to-drag ratio to be achieved, while nevertheless ensuring a wide safety margin from the stalling point. A further aim is to specify a method for operating a high-lift system such as this.

The object is achieved by a high-lift system having the features of claim 1. The object is also achieved by a method for operating a high-lift system having the features of claim 15.

The invention provides a high-lift system on the wing of an aircraft having high-lift flaps arranged on the wing and having a device for operating the high-lift system, by means of which device the high-lift flaps can be extended from a retracted position in order to increase the lift and a slot, through which flow passes from the lower face to the upper face of the wing, is opened between the flap and the wing. According to the invention, the device for operating the high-lift system is intended to open or close the slot through which flow passes, independently of the position of the high-lift flap, with the exception of when the high-lift flap is in the retracted state, in which, by definition, there is no slot.

The invention therefore allows the high-lift flaps to be extended and retracted with the slot closed, and the slot can be opened or closed independently of the position of the high-lift flaps.

With regard to the terminology used here, the opening and closing relate to relative movements with respect to the initial state. Closing therefore means that the size of the slot does not necessarily become zero, but that a residual slot may remain. Conversely, opening means enlarging the slot, but does not necessarily lead to it being moved as far as the opening limit.

Particularly, the high-lift system according to the invention comprises an operating device with a control device and actuation devices, wherein the control device is connected by a first command line to a first actuation device for driving a flap and with a second command line to a second actuation device for driving a slot opening and closing device, the control device comprising a function for generating a signal for actuation of the first actuation device and for generating a signal for actuation of the second actuation device.

The actuation command function can comprise an input module for receiving or operational data from an aircraft system device, and in that the command function comprises a function which, based on these input data, calculates positions of the flap and of the slot opening and closing device for transmitting the same to the first actuation device and to the second actuation device. The operational data can define a flight state or an operational aircraft system mode and/or define altitude, aircraft position and/or speed and/or define aircraft safety data or aircraft safety situation or system safety situation. The operational data can also comprise the command to bring the second actuation device in a close or open position.

Further, the high-lift system can comprise:
a table in which pre-defined operational data are set in relation to nominal positions of the flap and/or of the slot opening and closing device,
a comparison function by which, based on received operational data positions of the flap and/or of the slot opening and closing device are identified which are to be commanded, and which comprises a function to transmit the positions to the command device for transmittal to the flap and/or of the slot opening and closing device or a function to transmit the positions to the flap and/or of the slot opening and closing device.

Furthermore, the invention provides a method for operating a high-lift system on the wing of an aircraft, in which a high-lift flap which is arranged on the wing is extended from a retracted position in order to increase the lift, and a slot, through which flow passes and which passes air from the lower face to the upper face of the wing, is opened between the high-lift flap and the wing. The invention provides for the slot through which air flows to be opened and closed independently of the position of the high-lift flap, with the exception of when the high-lift flaps are in the retracted state, in which, by definition, there is no slot.

Advantageous embodiments and developments of the high-lift system according to the invention and of the method for its operation are specified in the respective dependent claims.

Exemplary embodiments of the invention will be explained in the following text with reference to the drawing, in which.

Figure 1:
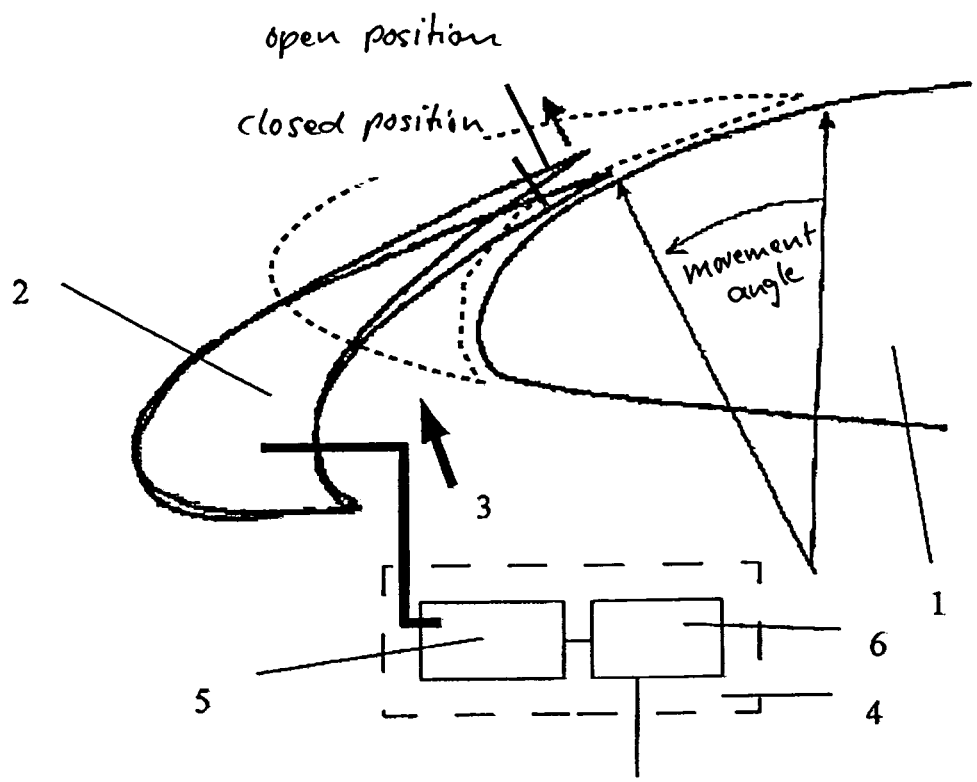
FIG. 1 shows a schematic cross-sectional view of a part of a high-lift system on the wing of an aircraft, showing the leading edge of the wing and a leading-edge slat which can be extended and is arranged on it, according to a first exemplary embodiment of the invention with rotary flap operation.
Figure 2:
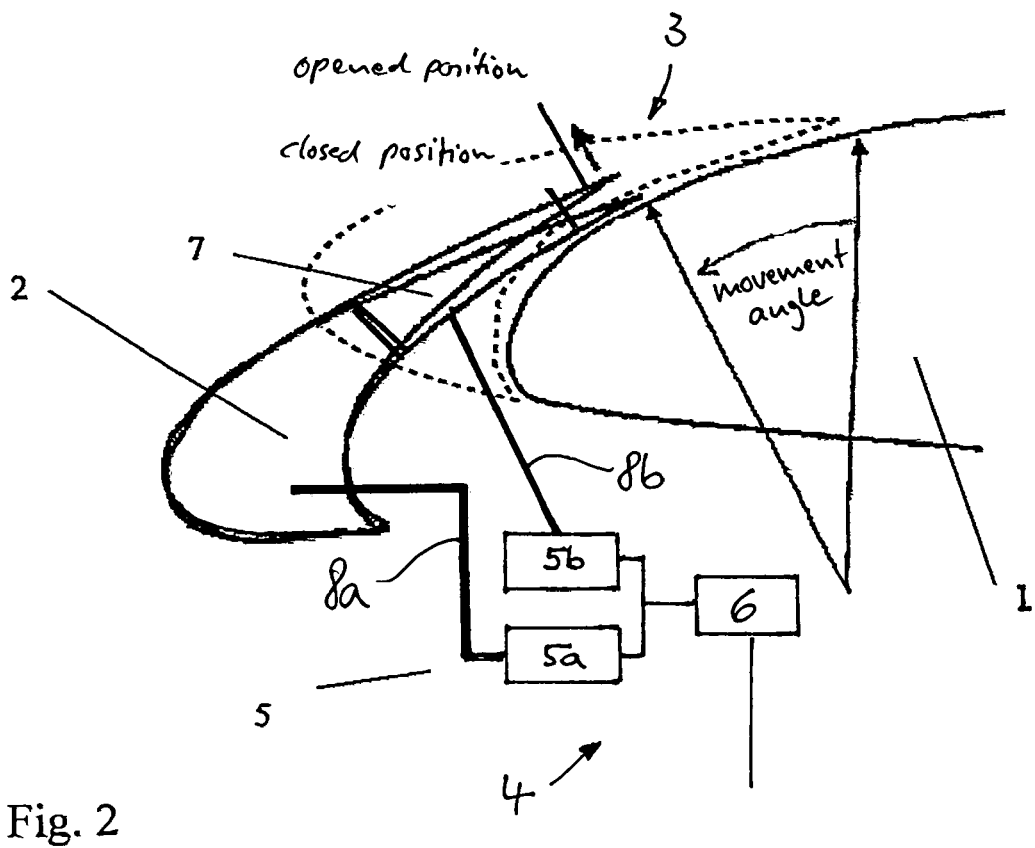
FIG. 2 shows a schematic cross-sectional view of a part of a high-lift system on the wing of an aircraft, showing the leading edge of the wing and a leading-edge slat which can be extended and is arranged on it, according to a second exemplary embodiment of the invention with a moving additional flap.

FIGS. 1 and 2 each show part of a high-lift system on the wing of an aircraft, comprising a leading-edge slat 2, which is arranged on the wing 1, and can be retracted and extended in respect of the wing 1 in order to increase the lift. The leading-edge slat 2 can be extended from a retracted position, which is shown by dashed lines, and in which the leading-edge slat 2 complements the wing 1 to form an essentially smooth, closed aerodynamic profile for cruise flight, to a position as shown by solid lines. In the extended positions, the total aerodynamic effective length of the wing profile 1 is increased in the direction of the airfoil chord (transversely with respect to the wingspan direction), and the curvature of the aerodynamically effective overall profile is increased at the same time, leading to the desired increase in lift.

The invention generally relates to a flap which is actuated by a first actuation device 5, wherein the flap can be a leading edge slat or a trailing edge flap.

The lift produced on the wing of an aircraft can be described by the lift equation $$L = \tfrac{1}{2} \cdot \rho_{Air} \cdot V^2 \cdot S \cdot C_L,$$

where L=Lift
$\rho_{Air}$=air density
S=wing area
$C_L$=coefficient of lift
V=actual speed.

The high-lift system provided for aircraft makes it possible to reduce the airspeed V by increasing the coefficient of lift ($C_L$) with constant lift L. The coefficient of lift $C_L$ is a function of the angle of attack (the angle between the wing profile chord and the incident air), and the respective flap position of the leading-edge slat and/or trailing-edge flap system. When the flow is laminar on the wing profile, then there is a largely linear relationship between the angle of attack $\alpha$ and the coefficient of lift $C_L$. Above a specific angle of attack $\sigma_{stall}$, the flow separates from the wing profile (stalls), and the coefficient of lift decreases as the angle of attack $\alpha$ increases further.

The primary flight control systems of modern aircraft make use of angle-of-attack control in order to prevent angle of attack $\alpha$ which would result in stalling, that is to say stalling of the aircraft. This angle-of-attack control is typically activated when a characteristic speed $V_{prot}$ (protection) is undershot and a corresponding angle of attack $\alpha_{prot}$ is exceeded. The angle-of-attack control is activated essentially below the minimum operationally permissible speed $V_{LS}$ (lowest selectable speed) and essentially above the associated angle of attack $\alpha_{Ls}$. This minimum operationally permissible speed $V_{LS}$ is defined as 1.23 times (for landing) or 1.13 times (for take-off) the speed $V_{S,\,1G}$ which corresponds to stalling in a steady flight state when subject to the acceleration due to the Earth's gravity 1G (S=stalling speed), that is to say:

For landing: $V_{LS} \geq v_{ref} = 1.23 \cdot V_{S,\,1G}.$
For take-off: $V_{LS} \geq v_{ref} = 1.13 \cdot V_{S,\,1G}.$
where $V_{ref}$=reference speed,
$V_{S,1G}$=stalling speed with a load multiple of 1.0 g.

$V_{LS}$ may be chosen to be greater than $V_{ref}$, and the associated angle of attack $\alpha_{Ls}$ may be chosen to be correspondingly smaller.

Figure 3:
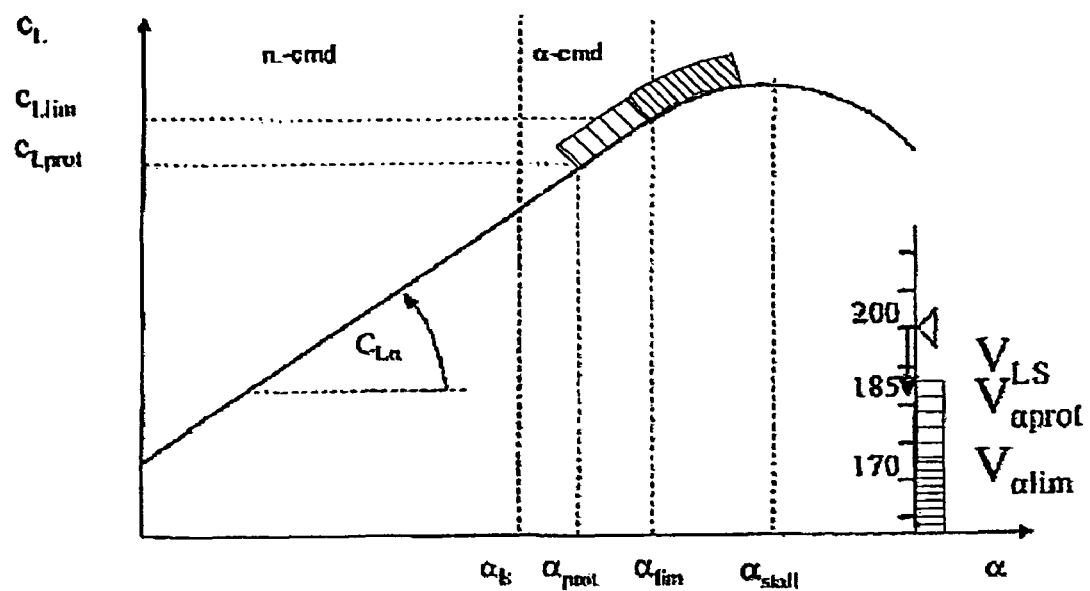
FIG. 3 shows a graph in order to explain the relationship between the coefficient of lift $C_L$ of the wing of an aircraft and the angle of attack $\alpha$.

The functional relationship between the coefficient of lift $C_L$ and the angle of attack $\alpha$ is illustrated in FIG. 3. As can be seen from this graph, the coefficient of lift $C_L$ first of all rises essentially linearly as the angle of attack $\alpha$ increases, until the maximum angle of attack $\alpha_{lim}$ which can be achieved in the steady state is reached, at which the flow can still be regarded as being completely laminar on the wing profile. If this angle of attack $\alpha_{lim}$ is exceeded, the flow successively starts to become separated from the wing profile, and this results in the curve shown in FIG. 3 becoming flatter above $\alpha_{lim}$. The curve reaches its maximum at the angle of attack $\alpha_{stall}$, and the coefficient of lift $C_L$ decreases as the angle of attack $\alpha$ is increased further, corresponding to stalling of the aircraft. The angles of attack $\alpha_{lim}$ and $\alpha_{prot}$ mentioned above, and the coefficients of lift $C_{Llim}$ and $C_{Lprot}$ corresponding to them, are likewise shown in FIG. 3.

The definition of the parameters $\alpha_{prot}$, $\alpha_{LS}$ and $\alpha_{lim}$ used here relate exclusively to the functionality described here and not to known analogies from the literature or existing systems.

In addition, by way of example, the associated speeds $V_{LS}$, $V_{\alpha prot}$ and $V_{\alpha lim}$ (speed in knots) are shown on a speed scale on the right-hand side of the graph. The lightly shaded area indicates the speeds between $V_{\alpha prot}$ and $V_{\alpha lim}$, corresponding to angles of attack between $\alpha_{prot}$ and $\alpha_{lim}$, with the angle-of-attack control being activated in this range, while the heavily shaded area below $V_{\alpha lim}$ and above $\alpha_{lim}$ indicates the area in which the flow starts to separate from the wing above the greatest angle of attack $\alpha_{lim}$ that can be achieved in the steady state and below the corresponding speed $V_{\alpha lim}$.

Referring once again to FIGS. 1 and 2, the invention provides that the slot 3 through which air passes from the lower face of the leading-edge slat 2 to the upper face of the wing 1, thus increasing the flow velocity on the upper face of the wing 1 and increasing the lift, can selectively be opened or closed, independently of the position of the leading-edge slat 2 (unless the leading-edge slat 2 is in the retracted state.

When the slot 3 is closed or when the slot 3 is only slightly open, the maximum achievable coefficient of lift is on the one hand lower but at the same time the noise caused by the slot 3 is reduced, and the lift-to-drag ratio is greater. The coefficients of lift with the slot open (vented position) and with the slot closed (sealed position) are respectively shown in FIGS. 4 and 5. As can be seen, up to the value $\alpha_{lim}$, the two curves are essentially superimposed while, beyond this, any increase in the coefficient of lift $C_L$ by $\Delta C_L$ can be regarded as the difference between the maximum coefficients of lift $C_{L,stall,vented}$ and $C_{L,stall,sealed}$.

The present invention uses this effect, by opening or closing the leading-edge slot 3 depending on the requirements for the instantaneous flight state, to make it possible to use a high coefficient of lift $C_L$ or a better lift-to-drag ratio, associated with reduced fuel consumption and the generation of less noise. In this case, the leading-edge slot 3 should preferably be opened and closed at a higher speed than that at which the leading-edge slat 2 is moved to extend or retract. Two coefficients of lift $C_{L,stall,vented}$ for the (completely) open slot 3 and $C_{L,stall,sealed}$ for the closed slot 3, possibly together with appropriate intermediate values, are thus possible for each flap position. In comparison to conventional functionalities, the opening of the leading-edge slot 3 is not predetermined in a fixed form of the flap position or coupled to the kinematics of the flap position, but can be chosen independently of this, for example as a function of the angle of attack α. The slot 3 can therefore be both closed and opened with respect to a specific flap position. This means that it is possible for the slot 3 to be kept entirely or largely closed during extension of the high-lift system, thus achieving a high lift-to-drag ratio, reduced noise generation and reduced fuel consumption, and for it to be opened, with flow passing through it, only when more energy must be supplied to the boundary layer on the wing profile in the high angle-of-attack α range in order to counteract the threat of stalling. The leading-edge slot 3 is therefore opened independently of the flap position, and is not predetermined by the flap kinematics.

By way of example, the slot 3 can be controlled by rotating or tilting the flap 2 about an axis which runs in the wingspan direction, as is illustrated in FIG. 1, wherein the flap 2 is illustrated in a position with the slot 3 closed and in a further position with the slot 3 open.

Alternatively, the slot 3 is controlled by a slot opening and closing device which is actuated by a second actuation device (not shown). Such a slot opening and closing device can particularly be realized by an own flap, for example by means of an auxiliary flap 7 which likewise extends in the wingspan direction, as is shown in FIG. 2. In this case, the auxiliary flap 7 is just selectively opened or closed in order to open or to close the slot 3.

Alternatively, the operating device can be designed such that the slot 3 is opened or closed by translational or rotary movement of a suspension for rails (tracks) to which the flap 3; 7 is fitted, or by corresponding movement of components of said suspension, wherein this movement is preferably caused by actuation of the second actuation device.

Figure 4:
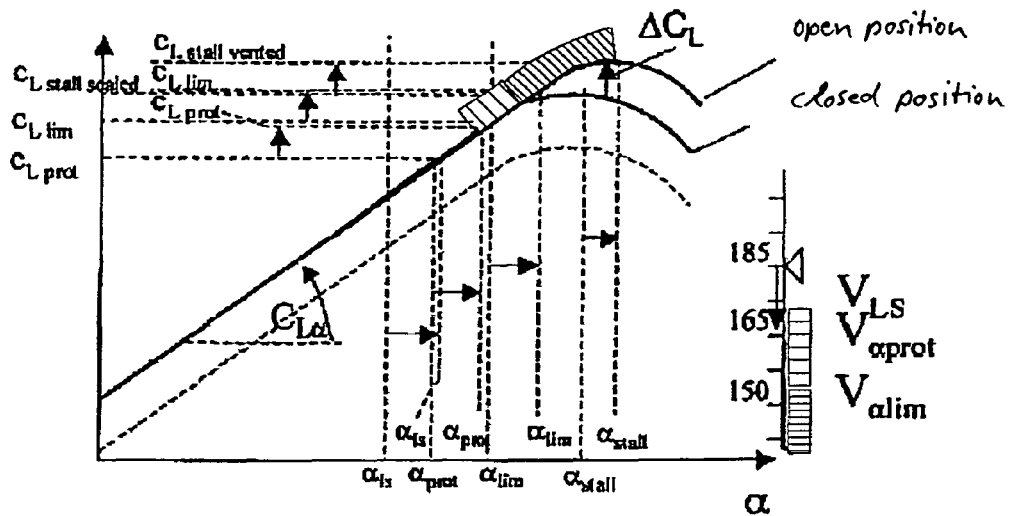
FIG. 4 and FIG. 5 show graphs similar to FIG. 3 in order to explain the way in which the present invention can be used to increase lift, according to two exemplary embodiments.
Figure 5:
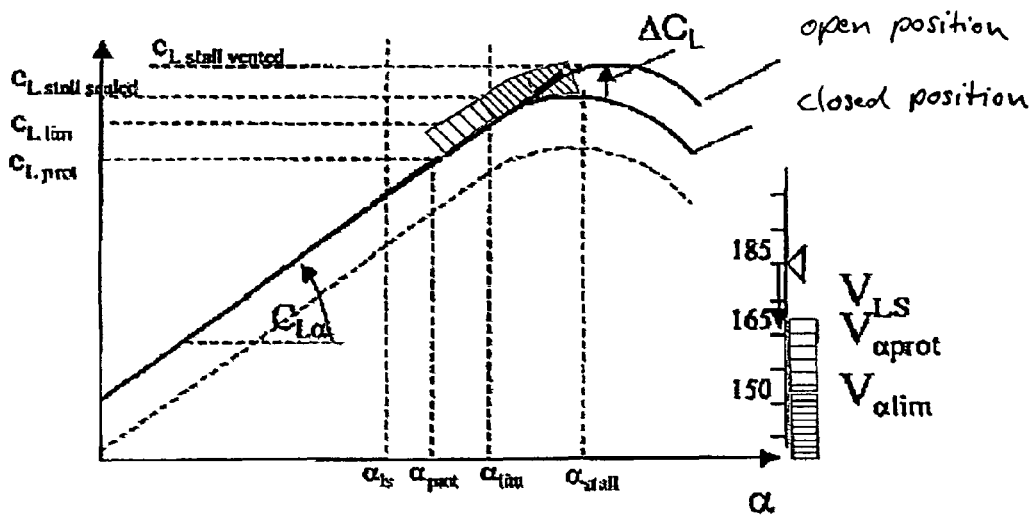

There are various options for functional implementation, two of which are illustrated in FIGS. 4 and 5. A distinction can be drawn between two situations, depending on the choice of the design point:

1. The coefficient of lift $C_{L,stall,vented}$ with the leading-edge slot 3 open is used for certification and thus for definition of the characteristic speeds. Operationally, the slot 3 is, however, closed for the various flap positions, and is opened quickly only on reaching or overshooting a defined angle of attack, for example $α_{prot}$. The coefficient of lift $C_{L,stall,vented}$ is therefore produced only when required, by activation of this protective function (Advanced Slat/Flap Gap Control). This is associated with a shift in the characteristic angle of attack and coefficients of lift, as is illustrated in FIG. 4.
2. Alternatively, the coefficient of lift $C_{L,stall,sealed}$ of the closed slot 3 is used operationally and for certification. The opening of the slot 3 creates an additional safety margin for lift, specifically by increasing the maximum coefficient of lift from $C_{L,stall,sealed}$ to $C_{L,stall,vented}$, as is illustrated in FIG. 5.

Mixtures of the two situations or else a different choice are, of course, also feasible.

As a consequence of situation 1), the aircraft is always operated with a higher lift-to-drag ratio and less noise, with the slot 3 being opened only in exceptional situations, which then corresponds to the state with a conventional high-lift system. By way of example, increasing the lift-to-drag ratio for take-off makes it possible either to choose the climb-out angle to be steeper (small additional improvement with noise being generated) or to cut back the thrust earlier or to a greater extent. The latter case also results in reduced fuel consumption, as well as a reduction in the exhaust-gas and noise emissions from the engine. A lower thrust level is used for landing, therefore likewise associated with reduced exhaust-gas and noise emissions. The reduction in the high-lift noise is a consequence of the closed slot 3, and the reduced engine noise is a result of the reduction in the thrust level owing to the improved lift-to-drag ratio.

The situation 2) has been based on the reduced coefficient of lift $C_{L,stall,sealed}$ with the leading-edge slot 3 closed for certification. In a corresponding manner either the wing area must be increased or the airspeed must be appropriately increased in order to maintain the total lift. The lift-to-drag ratio is improved in both cases. Despite the larger wing area, the noise from the high-lift system is reduced since there is no leading-edge slot 3 to contribute to the generation of noise. The opening of the slot as required increases the safety margin before stalling.

There are a number of possible ways to operate the high-lift system. The flap 2 can be extended and retracted with the slot 3 closed, and the slot 3 can be selectively opened or closed independently of the position of the flap 2 (except when the flap 2 is completely retracted when, by definition, the slot 3 is not present).

Generally, according to the invention, a operating device 4 including a control device 6 and actuation devices 5a, 5b are provided which is integrated in an aircraft system which are functional modules, f.e. realized by a software module, by hardware implemented functions (like ASICs) or by a computer module comprising a these functions as software modules implemented therein. The operating device 4 with the control device 6 can be integrated in the wing or in the fuselage as part of an aircraft electronic system.

The control device 6 comprises an actuation command function which is functionally connected and preferably in communication with the first actuation device 5a for generating a signal for actuation of the first actuation device 5a and with the second actuation device 5b for generating a signal for actuation of the second actuation device 5b. The first actuation device 5a and the second actuation device 5b can be integrated in one actuation device 5. Accordingly, the control device 6 is connected by a first command line 8a to the first actuation device 5a for driving the flap 2 and with a second command line 8b to the second actuation device 5b for driving the slot opening and closing device.

Depending on the function implemented in the actuation devices 5, 5a, 5b, the first command line 8a and the second command line 8b can be a bus line for transmitting digital command signals or can be a analogue signal line.

Based on the commands of the control device the actuation devices 5, 5a, 5b actuate the flap and the slot opening and closing device, respectively, wherein the actuation devices can be powered electrically or hydraulically.

The aircraft can comprise one flap or several flaps and one or several slot opening and closing devices on each wing. The control device and the first and second actuation device can be related to the one flap or to several flaps on both wings so that the flaps and the slot opening and closing devices on both wings are controlled by the first and second actuation device, respectively. Further, the operating device 4 can be configured such that the first and second actuation device are functionally coupled with one flap and a slot opening and closing device or a group of flaps and slot opening and closing devices on one wing or with one flap and a slot opening and closing device or a group of flaps and slot opening and closing devices which are provided symmetrically on both wings.

In the last case, several first and second actuation devices can be provided for actuating several flaps and slot opening and closing devices on both wings or several group of flaps and a slot opening and closing device on both wings.

In the following, the actuation of only one flap with a slot opening and closing device is described as example.

For the examples mentioned above, the embodiments are to be applied in an analogous manner.

The signals for actuation of the first and second actuation device can be generated, measured or calculated by an actuation command function of the control device upon operational data received by the actuation command function from another aircraft system device or operational data generated by the actuation command function itself. These operational data can f.e. be data describing or defining a flight state or an operational system mode like landing, approach or start. Particularly, these operational data or part of these operational data are generated, measured or calculated by the control device or by an another aircraft system and transmitted to the control device from another system device functionally and/or located externally with regard to the operating device 4, like another aircraft system device, the autopilot or a manual input device f.e. a man-machine interface (MMI), a pilot's control device, the primary flight system, the secondary flight system and the navigation system.

In one embodiment of the operating device 5, operational data are transmitted to the actuation command function of the control device. The command function, based on these input data, calculates positions of the flap and of the slot opening and closing device and sends these to the first actuation device 5a and to the second actuation device 5b which actuate the flap 2 and the slot opening and closing device, respectively. Also, this command function can be integrated in another aircraft system device outside the operating system 4, so that the operating system receives the desired or nominal positions of the flap and of the slot opening and closing device and transfers these position with or without changes to the actuation devices 5a, 5b for actuating the flap and of the slot opening and closing device, respectively.

In a further embodiment, the control device comprises a command function which is designed to receive from an aircraft system device operational data, f.e. data describing or defining the flight state, a manoeuvre or an operational system mode like landing, approach or start or a phase thereof. The command function generates desired or nominal positions of the flap and/or of the slot opening and closing device. For this purpose, the command function can comprise a table in which pre-defined operational data are set in relation to desired or nominal positions of the flap and/or of the slot opening and closing device. With the operational data as input, the command function generates or identifies the desired or nominal positions of the flap and/or of the slot opening and closing device for the instant flight situation and/or system state and sends these position data to the first and second actuation device which actuate the flap and the slot opening and closing device, respectively.

Further, a function can be integrated in the command function which, based on flight data like altitude and/or speed and/or based on aircraft system data like safety-related data (f.e. failure degradation in the slat or flap system or another system), generates further nominal positions of the flap and/or of the slot opening and closing device for the instant flight situation which are transmitted to the first and second actuation device which actuate the flap and the slot opening and closing device, respectively.

For example the command function can be designed such that, during an operational system mode, f.e. start or landing, when the aircraft reaches a pre-defined flight state, like a pre-defined position and/or speed and/or altitude, the command function generates a command to the flap and/or the slot opening and closing device if the actual flight state value reaches or exceeds a pre-defined value which is determined by a comparison function. This function can be implemented in order to comply with noise and/safety requirements and particularly in order to increase safety in critical flight phases. Particularly, the slot opening and closing device can be commanded to close during approach and/or landing while the flap stays in its position.

Further, a function can be provided in the actuation command function which stops the actuation of the flap and/or the slot opening and closing device, if a corresponding value is received by the operating device by another aircraft system device.

The command function can be designed such that it generates the command signals in discrete steps or continuously according to the situations described above.

The first and optionally the second actuation device can generally be coupled at least one position sensor for measuring the position of the flap and optionally one position sensor of the slot opening and closing device. The position sensor measures the actual position of the flap and/or the slot opening and closing device, respectively, and sends the actual position as feedback to the first and second actuation device. For failure detection a comparison of the nominal or desired value and the actual value is made in the corresponding actuation device 5a, 5b, or in the control device or in another module of the operating device 5 or in another aircraft system device. Based on the result of this comparison, the control device can receive or generate a fail safe command, f.e. not to actuate the flap and/or the slot opening and closing device.

The control device can be located close to the actuation devices 5a, 5b. In this case the control device or a part thereof, like the actuation command function, can be functionally connected to actuation devices 5a, 5b for transmitting the first and second, respectively, actuation command signals ("smart actuation device"). In this case, preferably a digital bus line connects the actuation devices with a control function of the control device which generates a desired value or nominal position value of the flap and the slot opening and closing device, respectively.

As has already been mentioned above, the command function can be configured such that it generates command signals by which the slot 3 is opened at a speed which is at least 1.5 times higher than the speed at which the flap 2 is itself extended.

The slot 3 can be opened by rotating or tilting the flap 2 about an axis which runs in the wingspan direction, for example, as is illustrated in FIG. 1, or by operating an auxiliary flap 7 which is arranged on the flap 2 and extends in the wingspan direction, for example as shown in FIG. 2. The auxiliary flap can also be formed by a miniflap, which is provided within the slot 3 and by means of which the slot 3 is at least partially opened.

The slot 3 can be opened by an actuation device 5 which can be operated independently of the position of the flap 2.

The actuation device 5 may be operated by a motor or motors.

By way of example, the actuation device 5 may be operated by spring force or by elastic deformation of components contained in it. The slot 3 can also be opened by aerodynamic forces.

The opening of the slot 3 can be enabled in response to an externally supplied signal, for example by releasing a catch or some other lock, and the slot 3 can be closed by a motor or motors.

The slot 3 may be opened as a function of the angle of attack α of the wing 1. This can be done by means of the control device 6 which is indicated in FIGS. 1 and 2 and, for example, may be a component of the flight control system or of the flap control system (slat/flap control system) of the aircraft. The control system may be designed, for example, such that the slot 3 is kept closed until a predetermined angle of attack $\alpha_{prot}$ is reached, and is opened successively or completely when this angle of attack is reached or exceeded. In this case, the angle of attack $\alpha_{prot}$ at which the slot 3 is opened can be chosen such that it is between the angle of attack $\alpha_{LS}$ which is associated with the lowest (or a selected) operationally permissible speed $V_{LS}$ and the highest angle of attack $\alpha_{lim}$ which can be achieved in the steady state when the slot 3 is closed.

The slot 3 may be continuously variable over a predetermined opening range, or may be variable discretely between a closed position and an open position.

It is also possible to provide for the slot 3 to be opened further the greater the extent to which the predetermined angle of attack $\alpha_{prot}$ is exceeded.

The high-lift flap may be a slat or a wing leading-edge slat 2, as in the case of the exemplary embodiments illustrated in FIGS. 1 and 2, or a wing trailing-edge flap. However, the physics and the variation in the aerodynamic characteristics differ somewhat when using trailing-edge flaps. The extension of trailing-edge flaps generally does not increase the angle-of-attack range, as is the case with a leading-edge slat (from $\alpha_{stall,sealed}$ to $\alpha_{stall,vented}$, see FIG. 4), and, instead, the lift curve ($C_L$ versus α) is shifted parallel upwards (increase in lift at α=0° and a corresponding situation for $C_{L,max}$). Operationally, this means a reduction in the angle of attack α for the same lift, or an additional load multiple for the same angle of attack α.

List Of Reference Symbols

1 Wing
2 High-lift flap
3 Slot
4 Operating device
5 Drive, actuating device
5*a* First actuation device
5*b* Second actuation device
6 Control device
7 Auxiliary flap
8*a* command line to the first actuation device
8*b* command line to the second actuation device

The invention claimed is:

1. A high-lift system for being disposed on the wing of an aircraft, the high-lift system comprising:
   a leading edge slat movably arranged on the wing and being a foremost flap of the high lift system with a front edge being oriented opposed to a predetermined airflow which is directed to the wing for producing a lift force and with a rear edge lying opposed to the front edge and facing the wing,
   a flap kinematics for moving the leading edge slat between a retracted position and different extended positions for increasing lift, in which positions, a slot between the rear edge of the leading edge slat and the wing is in a closed state in which flow between the leading edge slat and the wing is hindered or effectively hindered, and
   a slot opening and closing device movably connected to the leading edge slat, by which the leading edge slat or a rear part of the leading edge slat, which comprises the rear edge of the slat, is rotatable or tiltable about an axis which runs in the wingspan direction such that in an extended position of the leading edge slat,
   independently of the position of the leading edge slat, the rear edge is movable from the closed state to an opened state, in which, through the slot, flow passes from the lower face to the upper face of the wing when the predetermined airflow is directed to the wing and thereafter movable again to a closed state.

2. The high-lift system as claimed in claim 1, the rear part of the leading edge slat is formed by a miniflap provided within the slot.

3. The high-lift system as claimed in claim 1, wherein the flap kinematics is designed such that the slot is opened or closed by translational or rotary movement of a suspension for rails to which the leading edge slat is fitted, or by movement of components of said suspension.

4. The high-lift system as claimed in claim 1, wherein the high-lift system comprises an actuation device for actuation of the slot opening and closing device, so that the slot opening and closing device is actuable independently of the position of the leading edge slat.

5. The high-lift system as claimed in claim 4, wherein the actuation device is operated by a motor or motors.

6. The high-lift system as claimed in claim 4, wherein the actuation device is operated by spring force or elastic component deformation.

7. The high-lift system as claimed in claim 1, wherein the operating device is designed such that the slot through which flow passes is opened by aerodynamic forces.

8. The high-lift system as claimed in claim 6, wherein the operating device is intended to open the slot in response to an externally supplied signal, and to the close the slot by a motor or motors.

9. The high-lift system as claimed in claim 1, wherein the high-lift system comprises a control device which is configured to command the actuation device for actuation of the slot opening device as a function of the angle of attack or speed, or as a function of a parameter which is equivalent to the angle of attack or the speed.

10. The high-lift system as claimed in claim 9, wherein the control device is designed to command the actuation device for actuation of the slot opening and closing device such that the slot is kept closed until a predetermined angle of attack ($\alpha_{prot}$) is reached and is opened on reaching or exceeding the predetermined angle of attack ($\alpha_{prot}$), or is kept closed until a predetermined speed ($V_{prot}$) is reached, and is opened on reaching or undershooting the predetermined speed ($V_{prot}$).

11. The high-lift system as claimed in claim 1, wherein the high-lift system comprises an operating device with a control device and actuation devices, wherein the control device is connected by a first command line to a first actuation device for driving the leading edge slat and with a second command line to a second actuation device for driving the slot opening and closing device, the control device comprising a function for generating a signal for actuation of the first actuation device and for generating a signal for actuation of the second actuation device.

12. The high-lift system as claimed in claim 11, wherein the actuation command function comprises an input module for receiving or operational data from an aircraft system device, and in that the command function comprises a function which, based on these input data, calculates positions of the flap and of the slot opening and closing device for transmitting the same to the first actuation device and to the second actuation device.

13. A method for operating a high-lift system on the wing of an aircraft, the high-lift system comprising a leading edge slat as a foremost flap of the high-lift system, the method comprising:

moving the leading edge slat as the foremost flap of the high lift system with respect to the wing, the leading edge slat including a front edge being oriented opposed to a predetermined airflow that is directed to the wing for producing a lift force when interacting with the wing and a rear edge facing the wing, between a retracted position and different extended positions, in which positions a slot between a rear edge of the leading edge slat is in a closed state in which flow between the leading edge slat and the wing is effectively hindered, and rotating or tilting the leading edge slat or a rear part of the leading edge slat, which comprises the rear edge of the slat and which is movably connected to the leading edge slat, about an axis which runs in the wingspan direction such that, in an extended position of the leading edge slat, the rear edge can be arranged from the closed state to an opened state, in which through the slot flow passes from the lower face to the upper face of the wing when the predetermined airflow is directed to the wing, and thereafter again arranged to a closed state.

14. The method as claimed in claim 13, wherein the slot is open at a speed which is smaller than the speed at which leading edge slat is extended.

15. The method as claimed in claim 13, wherein the slot is opened as a function of the angle of attack or speed, or as a function of a parameter which is equivalent to the angle of attack or the speed.

16. The high-lift system as claimed in claim 10, wherein the slot is kept closed until a predetermined angle of attack ($\alpha_{prot}$) is reached and is opened on reaching or exceeding the predetermined angle of attack ($\alpha_{prot}$), or is kept closed until a predetermined speed ($V_{\alpha prot}$) is reached, and is opened on reaching or undershooting the predetermined speed ($V_{\alpha prot}$).

17. The high-lift system as claimed in claim 1, wherein the high-lift system comprises an operating device which activates the slot opening and closing device in order to open the slot through which flow passes, at a speed which is considerably smaller than the speed at which the leading edge slat is extended.

* * * * *